United States Patent
Drailing et al.

(10) Patent No.: US 9,642,043 B1
(45) Date of Patent: May 2, 2017

(54) DYNAMIC CALL ROUTING BASED UPON IDENTIFICATION OF INTERWORKING SERVER BY USER EQUIPMENT

(71) Applicant: Sprint Spectrum L.P., Overland Park, KS (US)

(72) Inventors: Ryan Drailing, Lenexa, KS (US); Paul Andreas, Overland Park, KS (US); John Prock, Raymore, MO (US)

(73) Assignee: Sprint Spectrum L.P., Overland Park, KS (US)

( * ) Notice: Subject to any disclaimer, the term of this patent is extended or adjusted under 35 U.S.C. 154(b) by 45 days.

(21) Appl. No.: 14/572,435

(22) Filed: Dec. 16, 2014

(51) Int. Cl.
*H04W 36/00* (2009.01)
*H04W 68/02* (2009.01)

(52) U.S. Cl.
CPC ....... *H04W 36/0022* (2013.01); *H04W 68/02* (2013.01)

(58) Field of Classification Search
CPC .......................... H04W 36/0022; H04W 68/02
See application file for complete search history.

(56) References Cited

U.S. PATENT DOCUMENTS

| | | | |
|---|---|---|---|
| 2005/0159161 A1* | 7/2005 | Florkey | H04W 36/12 455/450 |
| 2011/0076960 A1* | 3/2011 | Yun | H04W 24/10 455/67.14 |
| 2012/0015655 A1* | 1/2012 | Lee | H04W 8/02 455/435.1 |
| 2014/0349662 A1* | 11/2014 | Ekici | H04W 76/026 455/450 |
| 2015/0036611 A1* | 2/2015 | Kim | H04W 36/0022 370/329 |

* cited by examiner

*Primary Examiner* — Kashif Siddiqui
*Assistant Examiner* — Minjung Kim (57) ABSTRACT

Disclosed herein are methods and systems that may help to dynamically rout calls in a communication network where circuit-switched fallback (CSFB) is implemented. In particular, a user equipment (UE) may include an identifier of an interworking server (IWS), which relayed a page message from a first access network to a second access network for transmission to the UE, in the corresponding page response message that the UE sends to the first access network. The inclusion of the IWD identifier in the page response message may allow the switch that receives the page response message to detect when the corresponding voice call was received at a different switch in the first network, and responsively initiate an inter-system handoff when this is the case.

20 Claims, 6 Drawing Sheets

DYNAMIC CALL ROUTING BASED UPON IDENTIFICATION OF INTERWORKING SERVER BY USER EQUIPMENT

BACKGROUND

In a typical cellular radio communication system (wireless communication system), an area is divided geographically into a number of cell sites, each defined by a radio frequency (RF) radiation pattern from a respective antenna or antenna system. The antennas in the cells are in turn coupled to one or another form of controller, which is then coupled to a telecommunications switch or gateway, such as a mobile switching center (MSC) and/or a packet data serving node (PDSN) for instance. These (and possibly other) elements function collectively to form a Radio Access Network (RAN) of the wireless communication system. The switch or gateway may then be coupled with a transport network, such as the PSTN or a packet-switched network (e.g., the Internet).

Depending on the specific underlying technologies and architecture of a given wireless communication system, the RAN elements may take different forms. In a code division multiple access (CDMA) system configured to operate according IS-2000 and IS-856 standards, for example, the antenna system is referred to as a base transceiver system (BTS), and is usually under the control of a base station controller (BSC). In a universal mobile telecommunications system (UMTS) configured to operate according to Long Term Evolution (LTE) standards, the antenna system is usually referred to as a NodeB or an eNodeB, and the entity that typically coordinates functionality between multiple eNodeBs is usually referred to as a mobility management entity (MME). Other architectures and operational configurations of a RAN are possible as well.

A subscriber (or user) in a service provider's wireless communication system accesses the system for communication services via a communication device, such as a cellular telephone, "smart" phone, pager, or appropriately equipped portable computer, for instance. In a CDMA system the communication device is referred to as an access terminal (also referred to herein by "AT"); in an LTE system the communication device is referred to as user equipment (also referred to herein by "UE"). When an AT or UE is positioned in a cell, it communicates via an RF air interface with the BTS or eNodeB antenna of the cell. Consequently, a communication path or "channel" is established between the AT or UE and the transport network, via the air interface, the BTS or eNodeB, the BSC or MME, and the switch or gateway.

As the demand for wireless communications has grown, the volume of call traffic in most cell sites has correspondingly increased. To help manage the call traffic, most cells in a wireless network are usually further divided geographically into a number of sectors, each defined respectively by radiation patterns from directional antenna components of the respective BTS or eNodeB, or by respective antennas. These sectors can be referred to as "physical sectors," since they are physical areas of a cell site. Therefore, at any given instant, an AT or UE in a wireless network will typically be positioned in a given physical sector and will be able to communicate with the transport network via the BTS or eNodeB serving that physical sector.

Functionally, a BTS of a cell or an eNodeB may be referred to as a "base station." The actual physical configuration of a base station can range from an integrated BTS-BSC or eNodeB unit to a distributed deployment of multiple BTSs under a single BSC, or multiple eNodeBs under a single MME. Regardless of whether it is configured to support one cell, multiple cells, or multiple sectors, a base station is typically deployed to provide coverage over a geographical area on a scale of a few to several square miles and for tens to hundreds to several thousands (or more) of subscribers at any one time.

In some wireless communication systems or markets, a wireless service provider may implement more than one type of air interface protocol. For example, a carrier may support one or another version of CDMA, such as EIA/TIA/IS-2000 Rel. 0, A, and CDMA 2000 Spread Spectrum Systems Revision E (collectively referred to generally herein as "IS-2000") for both circuit-cellular voice and data traffic, as well as a more exclusively packet-data-oriented protocol such as EIA/TIA/IS-856 Rel. 0, A, or other version thereof (hereafter "IS-856"). A carrier could also implement an orthogonal frequency division multiple access (OFDMA) based system according to protocols specified by third generation partnership project (3GPP) Long Term Evolution ("LTE") Advanced, for example. Access terminals or UEs may be capable of communication under any or all such protocols, and may further be capable of handing off between them, in addition to being able to hand off between various configurations of coverage areas.

OVERVIEW

In areas where service is provided under both a 4G protocol such as Long-Term Evolution (LTE), and an older 3G CDMA protocol (e.g., IS-2000 and/or IS-856), service providers may implement circuit switched fallback (CSFB) and/or enhanced circuit switched fallback (eCSFB) functionality, both of which allow service providers to use their older existing CDMA network for voice calls, while at the same time using LTE to support mobile broadband.

With certain implementations of CSFB, a user equipment (UE) may, by default, operate with its CDMA receiver powered down, and only listen for pages via an LTE paging channel. Thus, when a radio access network (RAN) needs to page a wireless communication device for a circuit-switched call, the RAN may first page the wireless communication device via an LTE paging channel to establish a Radio Resource Connection (RRC) and send 1x-specific information to prepare the device to switch to the 1x network for the circuit-switched call. This indicates to the wireless communication device that it should turn on its CDMA receiver and listen to the CDMA paging channel for a page. The RAN can then send the page via the CDMA paging channel. Thus, a wireless communication device operating under CSFB may keep its CDMA receiver powered down, except when it is instructed to switch to a 1x network for circuit-switched services.

When eCSFB is implemented, a radio access network (RAN) may generally use its 3G traffic channels for voice calls and 1x-data calls, while using LTE signaling channels for all other functionality. As a result, a base station that implements eCSFB may use the LTE control channel for both LTE control channel messages and CDMA control-channel and paging-channel messages (e.g., for CDMA paging, CDMA call origination, SMS, CDMA feature notification, and other CDMA overhead message), whenever the device with which it is communicating is compatible with such functionality.

Further, under CSFB, when a UE is served by an LTE network and receives a page message for an incoming voice call, which is routed from a CDMA switch (e.g., an MSC)

to the UE via the LTE network, the LTE network will release and redirect the UE to connect to the CDMA network for the call. Upon receiving such instruction from the LTE network, the UE scans for CDMA coverage, selects a CDMA coverage area (e.g., a sector) that is detected during the scan, and sends a page response message (e.g., an access probe) to the CDMA base station that serves the selected coverage area.

However, under current CSFB implementations, an issue can arise in a scenario where the UE selects a coverage area that is served by a base station that is under control of a switch (e.g., MSC-2) that is different from the switch (e.g., MSC-1) that initially sent the CSFB page message to the UE via the LTE paging channel. This scenario may occur in various ways. For example, this scenario may occur when the UE is located at in a border area between coverage areas served by two different switches. In such a scenario, the CDMA switch (e.g., MSC-2) that receives the page response message from the UE, may not be able to connect the call, since the call was received and is waiting for the UE at a different CDMA switch (e.g., MSC-1).

Accordingly, example embodiments may help to provide for dynamic inter-system handoff in such scenarios. Of course, example embodiments may be implemented in other scenarios as well. In particular, a UE may provide an identifier of the switch that sent a CSFB page message to the UE via the LTE paging channel, in the UE's page response message. In an exemplary embodiment, the UE may identify a particular CDMA switch (e.g., a particular MSC) by way of interworking server (IWS) that provides an interface between the particular CDMA switch and the LTE network. By doing so, the UE may help the switch that receives the page response message determine whether it is also the switch that sent the corresponding page message, and initiate an inter-system handoff if it is not.

More specifically, in one aspect, an exemplary method involves: (a) receiving, by a first serving system in a first radio access network (RAN) that provides service under a first air interface protocol, an incoming call directed to a user equipment (UE); (b) sending, by the first serving system, to an interworking server that facilitates communications between the first RAN and a second RAN that provides service under a second air interface protocol, a page message that indicates the incoming call, such that the interworking server provides the page message for transmission to the UE via a paging channel of the second RAN; (c) receiving, by a second serving system in the first radio access network, a page response message that is transmitted by the UE in response to the incoming call, wherein the page response message comprises an identifier of the interworking server; (d) based at least in part on the identifier of the interworking server, the second serving system determining that the incoming call was received by the first serving system; and (e) responsively initiating an inter-system handoff to handoff the incoming call from the first serving system to the second serving system.

In another aspect, another exemplary method involves: (i) receiving, by a second serving system in a first radio access network (RAN) that provides service under a first air interface protocol, a page response message that is transmitted by a user equipment (UE) in response to a page message for an incoming call; (ii) based at least in part on an identifier of an interworking server that is included in the page response message, the second serving system determining whether or not an indication of the incoming call was previously received at the second serving system, wherein the interworking server facilitates communications between the first RAN and a second RAN that provides service under a second air interface protocol; (iii) if the indication of the incoming call was not previously received at the second serving system, then the second serving system: (a) using the identifier of the internetworking server as a basis for identifying a first serving system in the first radio access network that received the indication of the incoming call, and (b) initiating an inter-system handoff to handoff the incoming call from the first serving system to the second serving system; and (iv) otherwise, if the indication of the incoming call was previously received at the second serving system, then the second serving system connecting the incoming call to the UE.

In a further aspect, another exemplary method involves: (a) receiving, by a user equipment (UE), a page message, wherein the UE receives the page message via a paging channel of a second radio access network (RAN) that provides service under a second air interface protocol (LTE), wherein the page message indicates an incoming call directed to the UE has been received by a first RAN that operates under a first air interface protocol (1×), and wherein the page message comprises an identifier of an interworking server that facilitates communications between a first serving system of the first RAN and the second RAN; and (b) in response to receiving the page message that includes the identifier of the interworking server, the UE: (i) establishing a connection under the first air interface protocol in a given coverage area of the first RAN; (ii) generating a page response message that includes the identifier of the interworking server; and (iii) sending the generated page response message to a base station that serves the given coverage area.

BRIEF DESCRIPTION OF THE DRAWINGS

An exemplary embodiment of the present invention is described herein with reference to the drawings, in which.

DETAILED DESCRIPTION

Exemplary embodiments of the present invention are described herein. It should be understood that the word "exemplary" is used herein to mean "serving as an example, instance, or illustration." Any embodiment described herein as "exemplary" is not necessarily to be construed as preferred or advantageous over other embodiments. Further, those skilled in the art will understand that changes and modifications may be made to these embodiments without departing from the true scope and spirit of the invention, which is defined by the claims.

I. Exemplary Communication System Architecture and Functionality

Figure 1:
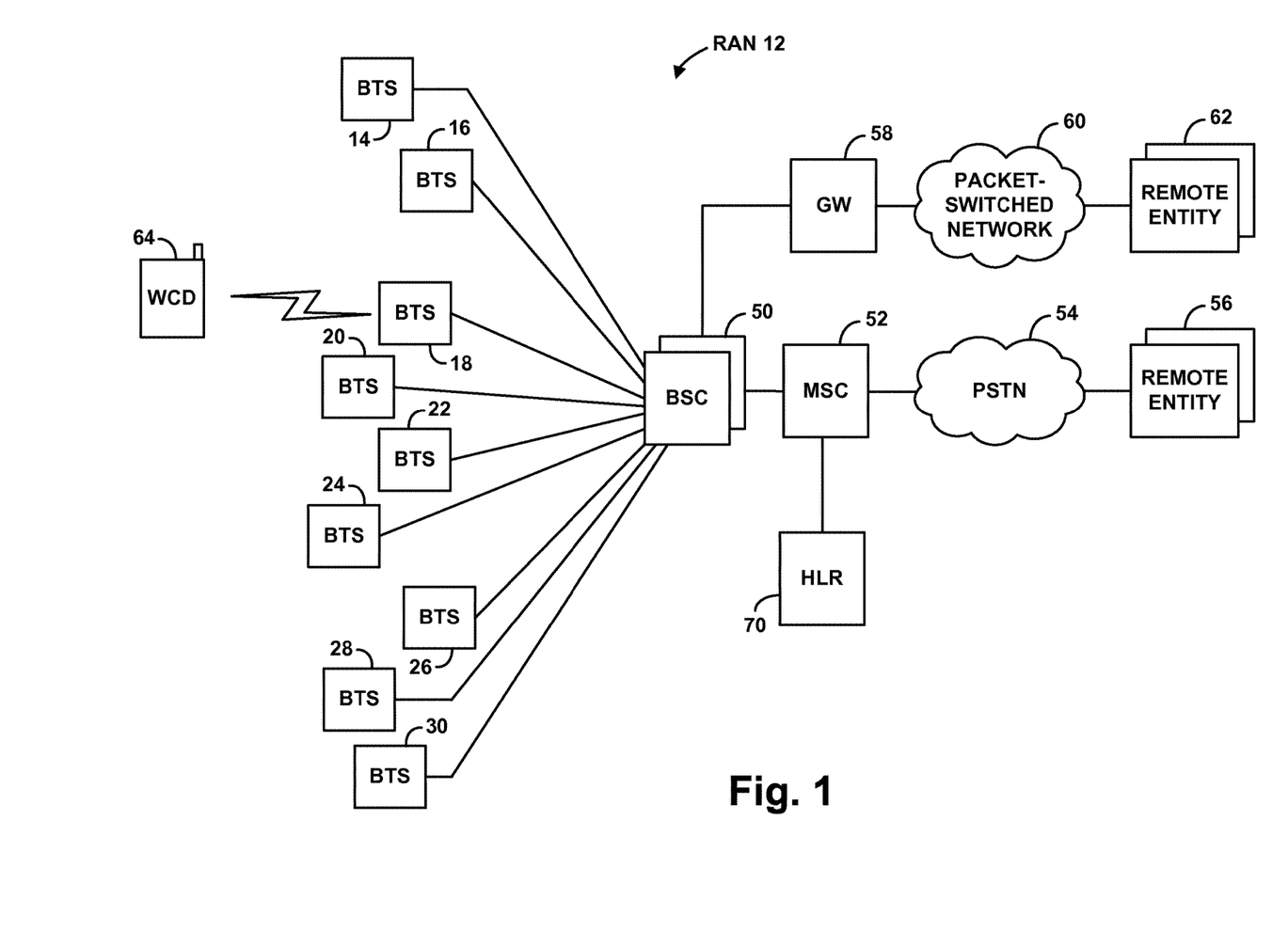
FIG. 1 is a block diagram illustrating a wireless communication network, according to an exemplary embodiment.

Referring to the Figures, FIG. 1 is a block diagram illustrating a wireless communication network, according to an exemplary embodiment. As noted, service providers may implement networks in which service is provided under a CDMA standard (e.g., IS-95, IS-2000, 1×RTT, 1×EV-DO, etc.), as well as under a 4G protocol such as LTE and/or WiMax. Service under both CDMA and LTE (and/or WiMAX) may be implemented in conjunction with the arrangement shown in FIG. 1 as well as in other configurations. Further, more specific details of an illustrative network with overlapping CDMA and LTE networks will be discussed in reference to FIG. 2.

As shown in FIG. 1, an exemplary network may include a radio access network (RAN) 12 that radiates to define numerous coverage areas in which wireless communication devices (WCDs) can engage in RF communication with the RAN. Herein, WCDs may also be referred to as "mobile stations" or "access terminals" as is common when referring to WCDs in the context of a CDMA network, and also as "user entities" (UEs), as is common when referring to WCDs in the context of an LTE network. Thus, the terms "mobile station," "wireless communication device" (or WCD), "access terminal," and "user equipment" (or UE) may be used interchangeably herein.

The RAN 12 may define these coverage areas discretely through use of directional antennas and/or by various modulation parameters, including, without limitation, carrier frequencies, PN offsets, and/or other parameters, depending on the air interface protocol used. Example air interface protocols include CDMA (e.g., IS-95, IS-2000, 1×RTT, 1×EV-DO, etc.), iDEN, WiMAX, TDMA, AMPS, GSM, GPRS, UMTS, EDGE, LTE, WI-FI (e.g., 802.11), BLUETOOTH, and others now known or later developed. In practice, the coverage areas may overlap to some extent, so that a served WCD can move seamlessly from one coverage area to another.

As shown, the RAN may include one or more base stations (also referred to as "base transceiver stations" (BTSs)), designated in the figure as base stations 14-30, and one or more base station controllers (BSCs) 50 (which may be integrated with or separate entities from the one or more of the base stations). The base stations preferably include directional antennas, power amplifiers, and associated transceiver equipment arranged to establish corresponding wireless coverage areas and to communicate with WCDs in those coverage areas.

The coverage areas served by base stations 14-30 may be cell sectors, or some other defined wireless coverage area (possibly even a combination of coverage provided by multiple base stations). Each base station 14-30 may serve a single coverage area (e.g., a single cell or sector), or may serve multiple discrete coverage areas, such as multiple sectors, for instance.

Each base station controller may be coupled with one or more switches, such as a mobile switching center (MSC) 52, which provides connectivity with the public switched telephone network (PSTN) 54, so that served WCDs can communicate with remote entities 56 on the PTSN. Additionally or alternatively, each base station controller may be coupled with one or more gateways, such as packet data serving node (PDSN) 58, which provides connectivity with a packet-switched network 60, so that served WCDs can communicate with remote entities 62 on the packet-switched network.

FIG. 1 depicts a representative WCD 64 by way of example, which could be a cell phone, tablet, laptop computer, wirelessly equipped personal digital assistant (PDA), personal computer, home electronic device, or any other type of wirelessly-equipped device now known or later developed. The WCD 64 is preferably equipped with hardware, software, and/or other logic to communicate with RAN 12 in accordance with an agreed communication protocol, such as one of the protocols noted herein for instance. For example, in an exemplary embodiment, WCD 64 includes a wireless communication interface that functions to facilitate air interface communication with RAN 12 according to one or more protocols such as those noted above.

Further, a WCD 64 may include a user interface, which typically includes components for receiving input from a user of a WCD and providing output to a user of the WCD. Yet further, WCD 64 may include program logic stored in data storage (e.g., one or more volatile and/or non-volatile storage components of the WCD, such as magnetic, optical, or organic storage components) and executable by one or more processors (e.g., general purpose and/or special purpose processors) to carry out various functions described herein.

Each mobile station, such as WCD 64, typically has at least one associated identifier that uniquely identifies the mobile station. By way of example, a mobile station may have a unique mobile directory number (MDN), a unique International Mobile Subscriber Identity (IMSI), a unique MAC address, or some other identifier dynamically or statically assigned to the mobile station, which may serve as its address for receiving air interface communications transmitted to it by the RAN. As a specific example, an IMSI is a unique number associated with the mobile station, typically taking the form of the mobile station's phone number. Additionally or alternatively, each mobile station may be assigned a mobile identification number (MIN). Further, in the context of LTE or other similar protocols, a WCD may be referred to as a UE and may have a UE identity.

In a further aspect, each mobile station typically has a service profile stored in the HLR 70. Each MSC 52 is in turn coupled with the HLR 70, typically by an out of band signaling network such as a Signaling System #7 (SS7) network for instance, and may thus access the service profile for a mobile station using an identifier for the mobile station, such as its MIN, MDN, and/or IMSI.

As noted above, FIG. 2 is a simplified block diagram of a wireless communication network 200 that includes two RANs; which provide wireless service under two different air interface protocols. In particular, wireless communication network 200 includes both a CDMA network and an LTE network. As such, a UE 202 may connect and communicate under different air-interface protocols, such as CDMA and LTE.

Figure 2:
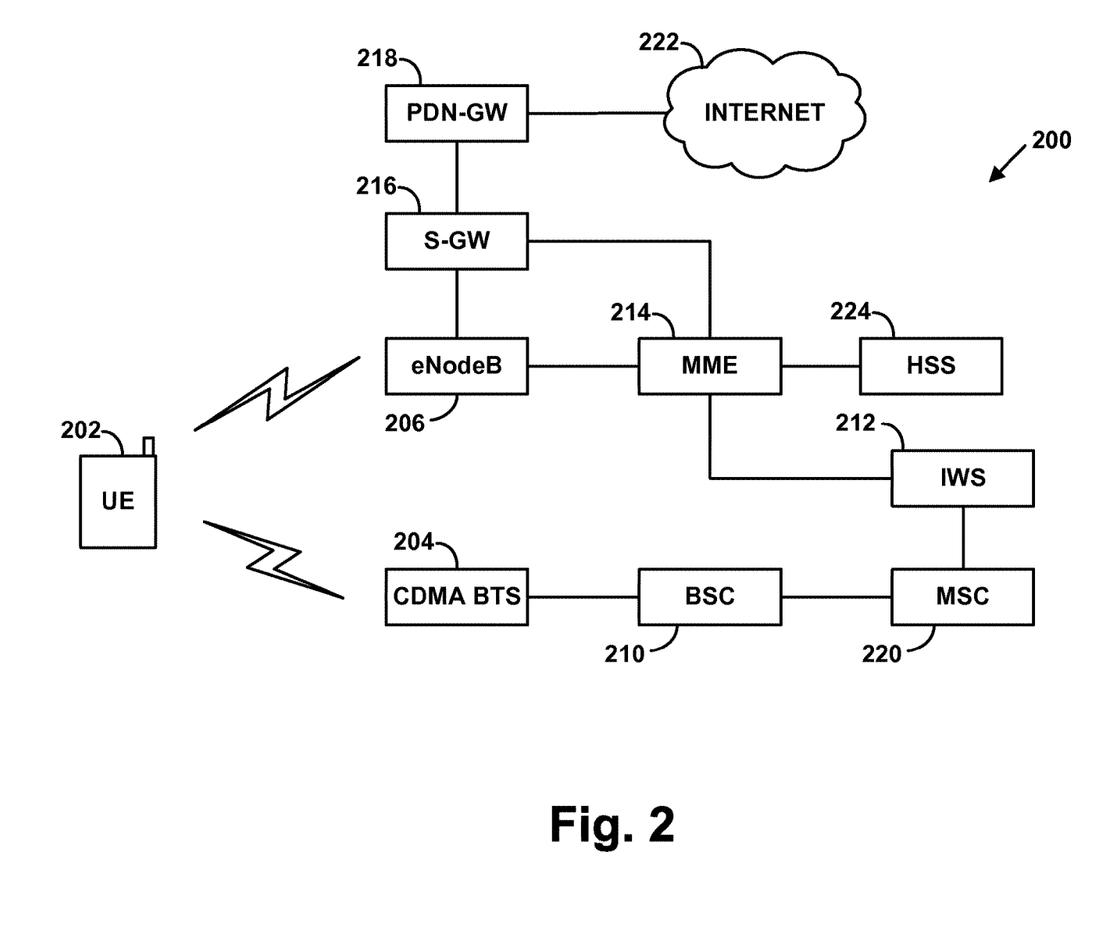
FIG. 2 is a simplified block diagram of a wireless communication network in which a service provider supports wireless service under two or more different air interface protocols, according to an exemplary embodiment.

As noted, network 200 may include two or more separate access networks with overlapping coverage areas (e.g., separate access network for LTE and CDMA). However, in some embodiments, one or more components of the two access networks may be combined in the same physical component or components, so as to support aspects of both CDMA and LTE communications, for example. Further, a single service provider may operate two networks with overlapping coverage areas, such as overlapping CDMA and LTE networks, for example. As such, the combination of two different types of RANs with overlapping coverage areas, may also be considered a single RAN that is configured to provide service under two or more different air interface protocols. Embodiments herein should be understood to apply equally regardless of whether or not different types of RANs with overlapping coverage areas are considered separate RANs or are considered part of a single RAN that provides service under multiple air interface protocols.

In the illustrated configuration, network 200 includes components of a CDMA network to provide for CDMA communications. Specifically, FIG. 2 shows a BTS 204, a BSC 210, and an MSC 220, which collectively (and possibly in conjunction with other components that help to provide service under CDMA) may be referred to as a CDMA network or a CDMA RAN. Note that BTS 204, BSC 210, and MSC 220 may be configured for the same or similar functions as BTSs 14-30, BSC 50, and MSC 52, which were described in reference to FIG. 1.

Network 200 also includes components of an LTE RAN to provide a UE 202 with service under LTE. In particular, network 200 includes one or more eNodeBs 206, which are base stations configured to support over-the-air communications with UEs 202 under LTE. Each eNodeB 206 may provide service under LTE in one or more coverage areas, such as a cell or one or more cell-sectors.

To support LTE communications, network 200 also includes a mobility management entity (MME) 214, which may be configured to control communications between one or more eNodeBs 206 and a serving gateway (S-GW) 216. MME 28 may also be communicatively coupled to a home subscriber server (HSS) 224, which stores subscriber information, such as information related to UE 202. More generally, an MME 214 may support functionality such as mobility management, bearer management, security functions, authentication of UEs, gateway selection for communications, and so on. Further, in the context of paging, an MME may function as a paging controller that distributes paging messages to the appropriate eNodeBs for transmission to UEs. Accordingly, where appropriate, the paging functionality described in reference to an MME herein may also be implemented by other entities or combinations of entities that function as a paging controller.

In an exemplary configuration, S-GW 216 may be configured to communicate with one or more eNodeBs 206 and/or with MME 214 in order to provide various functions such as packet routing and forwarding, mobility anchoring, packet buffering, and so on. For instance, S-GW 216 may provide packet routing for LTE communications to and/or from UE 202. Yet further, an LTE access network may include a packet data network gateway (PDN-GW) 218, which facilitates packet-data communications between an S-GW 216 that operates according to LTE, and a packet-data network, such as the Internet 222.

In a further aspect, network 200 may include or be in communication with an interworking server (IWS) 212. IWS 212 is a functional component that supports interworking between different wireless technologies, such as CDMA and LTE. Note that an IWS may also be referred to as an interworking function (IWF). In an exemplary configuration, IWS 212 may support communications between components of an LTE network (e.g., MME 214) and components of a CDMA network (e.g., BSC 210 and/or MSC 220), so that a service provider may implement circuit switched fallback (CSFB) or enhanced circuit switched fallback (eCSFB) functionality. As such, IWS 212 may be implemented by an entity or entities of the CDMA network, such as the MSC and/or HSS, for instance. An IWS 212 may also be implemented by other entities.

While FIG. 2 shows a single IWS 212, an exemplary configuration may include multiple IWSs in the same network. In such a configuration, each IWS 212 may be dedicated to one particular MSC, and thus may only provide an interface between that particular MSC and an LTE network. Further, each IWS 212 may be identified by a unique identifier, which may be referred to as an IWS-ID.

Thus, the IWS-ID for each IWS 212 may be used to identify the particular MSC 220 that accesses the LTE network via that IWS.

A UE 202 that is configured for CSFB may register with the CDMA-portion of system 200 via an LTE network. For example, a UE 202 may send CDMA registration messages via an eNodeB 206 and an MME 214. The IWS 212 may be configured to encapsulate and relay such CDMA registration messages to MSC 220, in order to register UEs with the CDMA network.

To facilitate CSFB and/or eCSFB functionality, an LTE network may use, e.g., S102 tunnel redirection, to establish an LTE tunnel between an IWS 212 and a UE 202 via MME 214 and eNodeB 206. IWS 212 may then use the LTE tunnel for CDMA messaging with the UE 202 (e.g., messaging that would typically have occurred over a CDMA paging channel and/or a CDMA access channel). Accordingly, when a UE 202 connects to LTE network via an eNodeB 206, it can communicate with CDMA MSC 220 through IWS 212, which functions to bridge the LTE network and the CDMA network, and to encapsulate and relay CDMA messages between the UE 202 and the MSC 220. When the IWS 212 encapsulates a page message, which is received from an MSC 220 and relayed to an MME 214, the IWS may include its IWS-ID and/or other information with the page message.

Under CSFB, a UE 202 may, by default, operate with its CDMA receiver powered down, and only listen for pages via an LTE paging channel. Thus, when a RAN needs to page a wireless communication device for a voice call, the LTE network may first page the UE via an LTE paging channel. In particular, when the 3G (e.g., CDMA) network seeks to page a UE, the CDMA network sends a page message to the LTE network. For example, an incoming CDMA voice call, which is directed to UE 202, may be received at MSC 220. Under CSFB, MSC 220 may responsively send a page message for the voice call to IWS 212, which in turn may encapsulate and send the page message to MME 214.

Once the MME 214 receives the page message, the LTE network sends the page message to the UE 202. To do so, the IWS 214 may send the page message via the MME 214 to the eNodeB 206 that is serving the UE 202, so that the eNodeB 206 can transmit the page message to the UE. This type of page message (e.g., sent according to CSFB for a CDMA voice call) may also be referred to herein as a "CSFB page message." The UE 202 may then respond by, e.g., sending an Extended Service Request (ESR) message to the LTE network to indicate a switch back to the CDMA network. Upon such response from the UE 202, the eNodeB 206 may send a message to the UE to direct the UE to connect to the CDMA network 203 and suspend LTE service to the UE.

The UE 202 then scans for CDMA coverage and goes through an acquisition process with the CDMA network; including, for example, reading the pilot and sync channels, and requesting and receiving assignment of a traffic channel. For instance, the UE 202 may power on its CDMA receiver, scan the coverage area or areas that are designated for fall back to the CDMA network for respective pilot signals, and select the coverage area (e.g., the sector) having the strongest pilot signal (e.g., the highest signal-to-noise ratio). The UE 202 may then send a page response message to the CDMA network, and specifically, to the BTS serving the selected coverage area, in an effort to accept and conduct the voice call via the CDMA network.

In an exemplary embodiment, when the UE 202 response to a CSFB page message, the UE 202 may insert the IWS-ID of the IWS 212 that initially relayed the page message to the LTE network, into the page response message. To facilitate such functionality, a CSFB page message that is sent to and received by the UE 202 may include the IWS-ID of the IWS 212 that relayed the page message to the LTE network. Additionally or alternatively, the IWS-ID of the IWS 212 that relayed the page message to the LTE network may be provided to the UE 202 in a message that directs the UE to connect to the CDMA network and/or to suspend LTE service to the UE. The IWS-ID of the IWS 212 that relayed the page message to the LTE network may also be provided to the UE in other types of messages.

II. Exemplary Computing Systems

Figure 3:
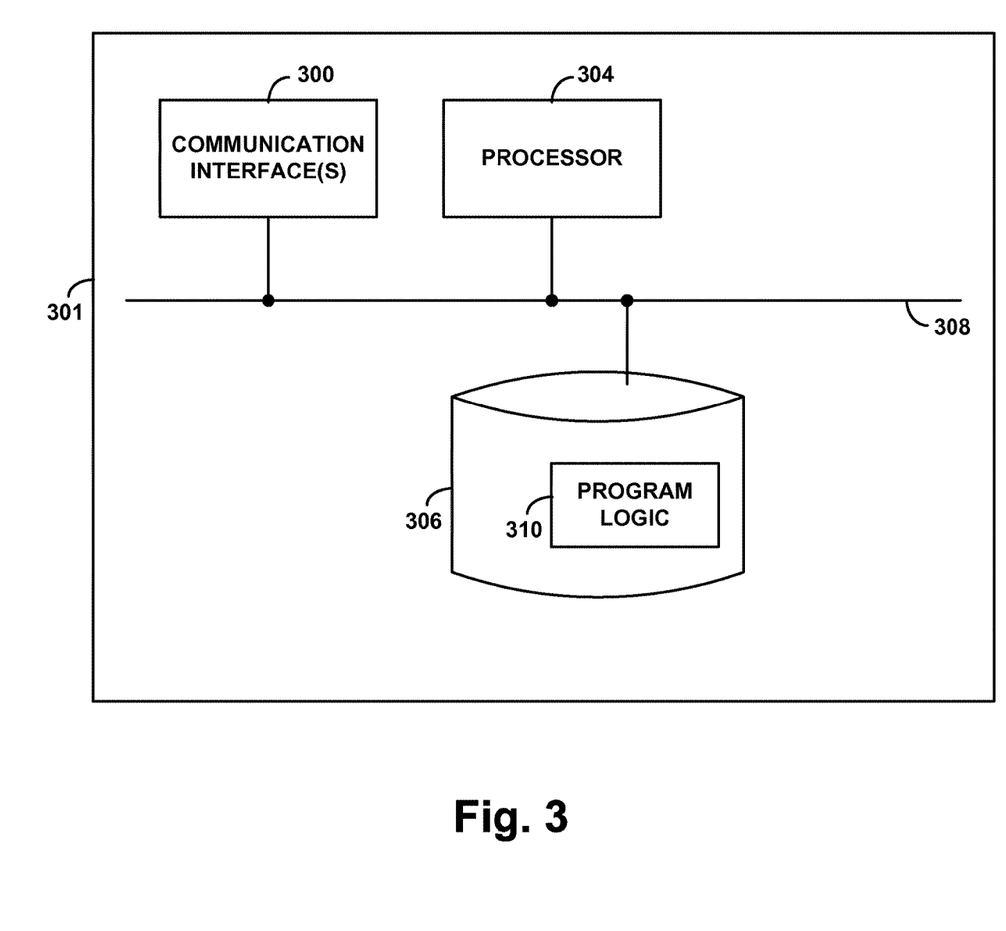
FIG. 3 is a simplified block diagram exemplifying a network component, according to an exemplary embodiment.

FIG. 3 is a simplified block diagram exemplifying a computing system 301, according to an exemplary embodiment. In particular, FIG. 3 illustrates functional components of a computing system 301 that may be implemented in a RAN component (e.g., a serving system such as an MSC), which is arranged to operate in accordance with the embodiments herein. The functional components of the computing system 301 may also be implemented in a UE that is arranged to operate in accordance with the embodiments herein.

As shown, the computing system 301 may include one or more communication interfaces 300, a processor 304, and data storage 306, all of which may be communicatively linked together by a system bus, network, or one or more other connection mechanisms 308.

In practice, computing system 301 may take the form of or be implemented in a serving system such as an MSC, or may take the form of another component of an LTE or CDMA network. Further, the illustrated components of computing system 301 (e.g., communication interface 300, a processor 304, and/or data storage 306) may be distributed and/or subdivided between one or more entities in an LTE network and/or in a CDMA network. It should be understood that an exemplary system may also take the form of another network entity or combinations of other network entities, without departing from the scope of the invention.

In computing system 301, communication interface 300 may comprise one or more or wired or wireless communication interfaces and/or other associated equipment for engaging in communications with other network entities and/or for engaging in RF communications according to one or more air interface protocols.

Data storage 306 may be a non-transitory computer readable medium. For example, data storage 306 may take the form of one or more volatile and/or non-volatile storage components, such as magnetic, optical, or organic storage components, integrated in whole or in part with processor 304. As further shown, data storage 306 contains program logic 310 (e.g., machine language instructions) executable by processor 304 to carry out various functions, such as the functions of the exemplary methods and systems described herein.

III. Exemplary Access Network Methods

Figure 4A:
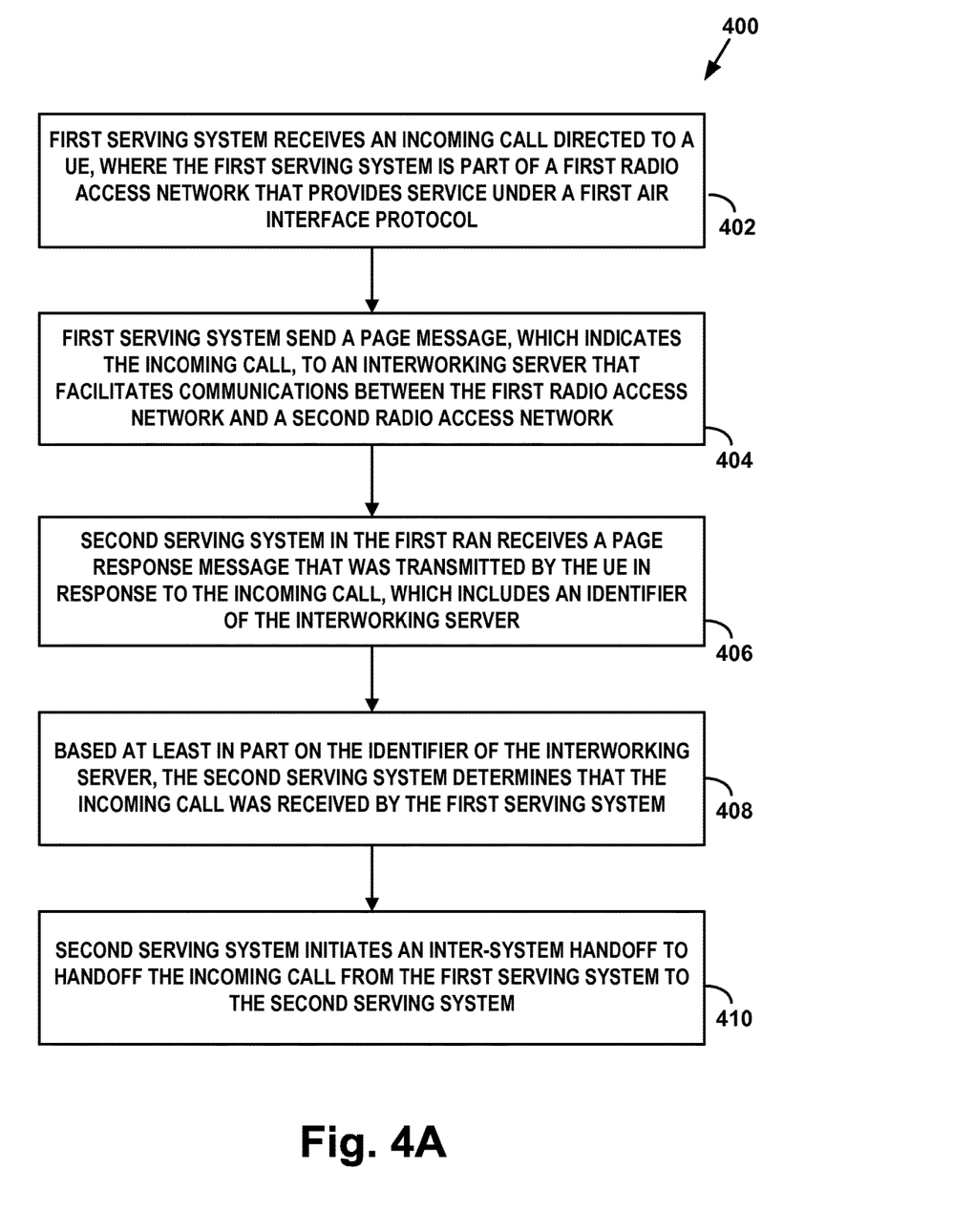
FIG. 4A is flow chart illustrating a method, according to an exemplary embodiment.

FIG. 4A is flow chart illustrating a method 400, according to an exemplary embodiment. Method 400 may be implemented by one or more network components in a first network and/or in a second network, where the second network is configured for CSFB with the first network. For example, method 400 may be implemented by one or more network components in CDMA network and/or by one or more network components in an LTE network, such by one or more MSCs in CDMA network, one or more MMEs in an LTE network, and/or an IWS, in addition or in the alternative to other components of a CDMA and/or LTE network. Of course, it should be understood that method 400, or portions thereof, may be implemented by other entities or combinations of entities, without departing from the scope of the invention.

As shown by block 402, method 400 involves a first serving system receiving an incoming call directed to a UE. In an exemplary embodiment, the first serving system is part of a first radio access network that provides service under a first air interface protocol. At block 404, the first serving system sends a page message, which indicates the incoming call, to an interworking server that facilitates communications between the first RAN and a second RAN that provides service under a second air interface protocol.

In an exemplary embodiment, the first air interface protocol may be a 3G CDMA protocol, and the second air interface protocol may be an LTE protocol. In such an embodiment, the first serving system may be an MSC in the CDMA network, which receives a CDMA voice call and responsively sends the page message to the IWS in accordance with a CSFB arrangement. In such an embodiment, the IWS can then provide the page message to an LTE network for transmission to the UE via a paging channel of the LTE network. For example, the IWS may encapsulate the page message before sending the page message to the MME that serves the LTE coverage area in which the UE is registered. As such, the MME can send the page message to the UE via one or more eNodeBs. Further, when the IWS encapsulates the page message, the IWS may add information to the page message, such as the IWS-ID that identifies that particular IWS. In some embodiments, the IWS may encapsulate additional information with the page message, in addition to its IWS-ID.

When the UE receives the page message via the paging channel of the second RAN (e.g., the LTE network), the UE engage in a process by which it scans for service under the first air interface protocol, and sends a page response message to the first RAN. An example of such a UE-implemented method is described in greater detail in reference to FIG. 4 below.

Referring back to FIG. 4A, method 400 further involves a second serving system in the first RAN receiving the page response message that was transmitted by the UE in response to the incoming call, which includes an identifier of the interworking server, as shown by block 406. However, the second serving system may be different from the first serving system that initially receiving the incoming call and sent the page message to the UE via the IWS and second RAN. For instance, the page response message may be received at a different MSC than the MSC from which a corresponding CSFB page message originated.

Note that the situation where the MSC receiving the page response message from a UE differs from the MSC where the corresponding incoming call was received and is waiting for the UE may occur in various scenarios. For example, this situation may occur when a UE is initially registered in a sector of first CDMA base station that is served by a first MSC, which has a neighbor coverage area served by a second MSC. Since the UE is initially registered in a sector served by the first MSC, the incoming call may be directed to the first MSC, which may then initiate the CSFB paging process. However, upon receipt of the CSFB page message, the UE scans for CDMA service, and in some cases, may determine that the UE is better served by the neighbor coverage area (e.g., because the neighbor coverage area has a stronger pilot signal than the coverage area in which the UE last registered). As such, the UE may establish a CDMA connection in the neighbor coverage area and send a page response message. Thus, when the BTS that serves the neighbor coverage area receives the page response message, the BTS may send the page response message on to the second MSC.

Accordingly, based at least in part on the identifier of the interworking server (which was inserted in the page response message by the UE), the second serving system may determine that the incoming call was received by the first serving system, as shown by block 408. In response, the second serving system initiates an inter-system handoff to handoff the incoming call from the first serving system to the second serving system, as shown by block 410.

Figure 4B:
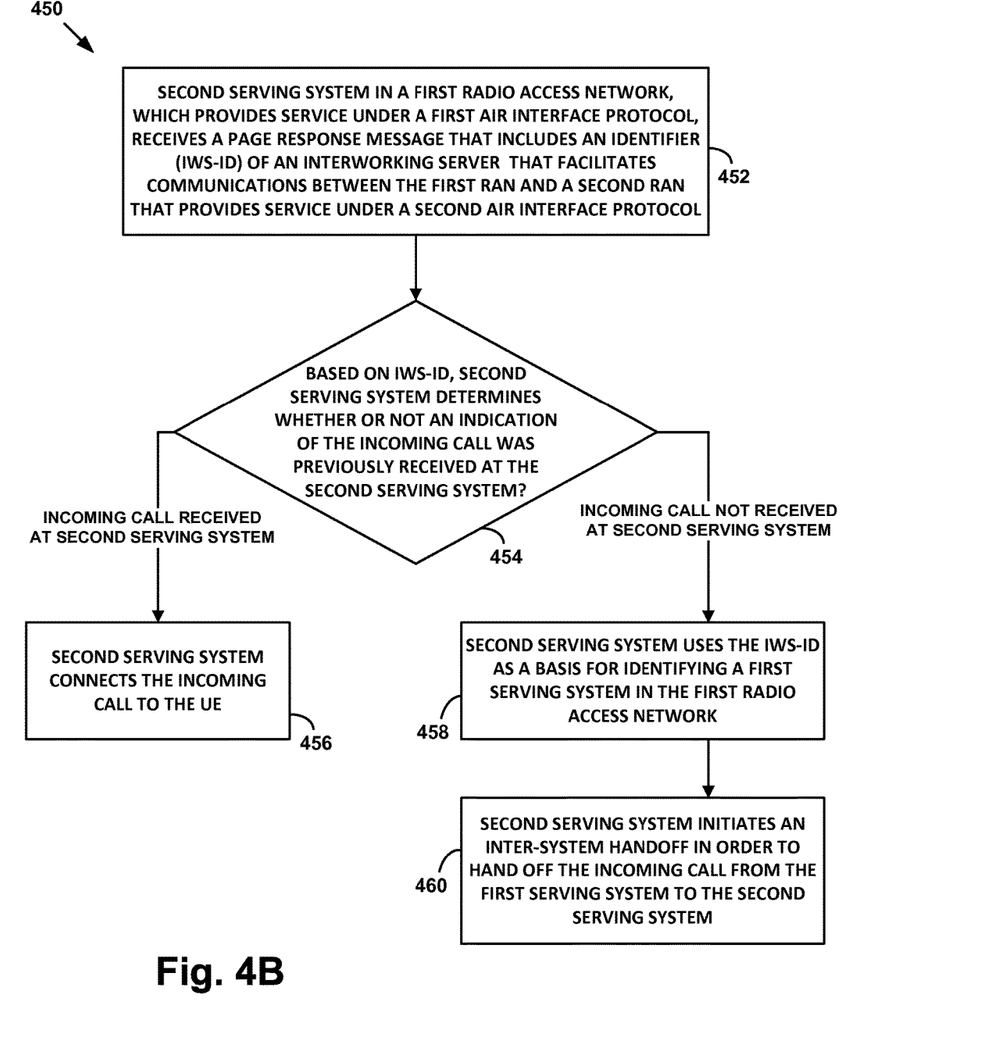
FIG. 4B is flow chart illustrating another method, according to an exemplary embodiment.

FIG. 4B is flow chart illustrating another method 450 according to an example embodiment. In particular, method 450 may be carried out by a second serving system that receives a page response message from UE, in order to determine whether or not an intersystem handoff is appropriate, and initiate the intersystem handoff it is.

More specifically, method 450 involves a second serving system in a first radio access network that provides service under a first air interface protocol (e.g., CDMA), receiving a page response message that includes an identifier of an interworking server (IWS) that facilitates communications between the first RAN and a second RAN that provides service under a second air interface protocol (e.g., LTE), as shown by block 452. In an exemplary embodiment, the page response message was transmitted by a UE upon receiving a CSFB page message for an incoming call, via a paging channel of the second RAN.

Based at least in part on the identifier of the interworking server, the second serving system determines whether or not an indication of the incoming call was previously received at the second serving system, as shown by block 454. If an indication of the incoming call was previously received at the second serving system, then the second serving system connects the incoming call to the UE, as shown by block 456.

On the other hand, if the second serving system did not receive the incoming call (e.g., if the resources for the call are not reserved and/or set up with the second serving system), then the second serving system may assume that the incoming call was received at another serving system. Further, in exemplary embodiment, each IWS may only interface one MSC with an LTE network. Accordingly, the second serving system (e.g., a second MSC in a CDMA network) may use the IWS-ID as a proxy to identify the other serving system that sent the CSFB page message, and at which the incoming call for the UE is presumably waiting.

Continuing with method 450, if the indication of the incoming call was not previously received at the second serving system, then the second serving system may responsively use the identifier of the internetworking server (e.g., the IWS-ID) as a basis for identifying a first serving system in the first radio access network (e.g., the serving system that received the indication of the incoming call), as shown by block 458. Further, the second serving system may responsively initiate an inter-system handoff in order to handoff the incoming call from the first serving system to the second serving system, as shown by block 460.

In a further aspect of some embodiments, the second serving system may condition the performance upon a determination that a page response message includes an interworking identifier. More specifically, the inclusion of an IWS-ID in a page response message may be an indication that the page response message is responsive to a CSFB page message (rather than a page message sent via a paging channel of the CDMA network). Accordingly, when the second serving system receives the page response message at block 452, the second serving system may responsively determine whether the page response message includes an IWS-ID. If the page response message does include an IWS-ID, this may indicate that the UE was paged using a CSFB paging process, and that an example method may help to prevent a dropped call or delayed call connection. Accordingly, if the second serving system detects an IWS-ID in the page response message received at block 452, then the second serving system may proceed with the remainder of method 450.

Further, in some embodiments, method 450 may terminate if the second serving system believes that the page response message is responsive to a standard CDMA page message (or another non-CSFB paging process). For example, if a second MSC does not detect an IWS-ID in a page response message received at block 452, then the second MSC may proceed to connect the call under CDMA (or another non-CSFB process). Other examples are also possible.

It should be understood that the conditioning of an exemplary network-implemented method (or portions thereof) upon the inclusion of an IWS-ID in the page response message, and/or the termination of an exemplary method when the page response message does not include an IWS-ID, are optional. Further, in some embodiments, it may be considered undesirable to perform an exemplary method, such as method 450, when a page response message is not responsive to a CSFB page message (however, in other embodiments, it may not be considered undesirable to perform an exemplary method in this scenario).

IV. Exemplary Client Device Methods

Figure 5:
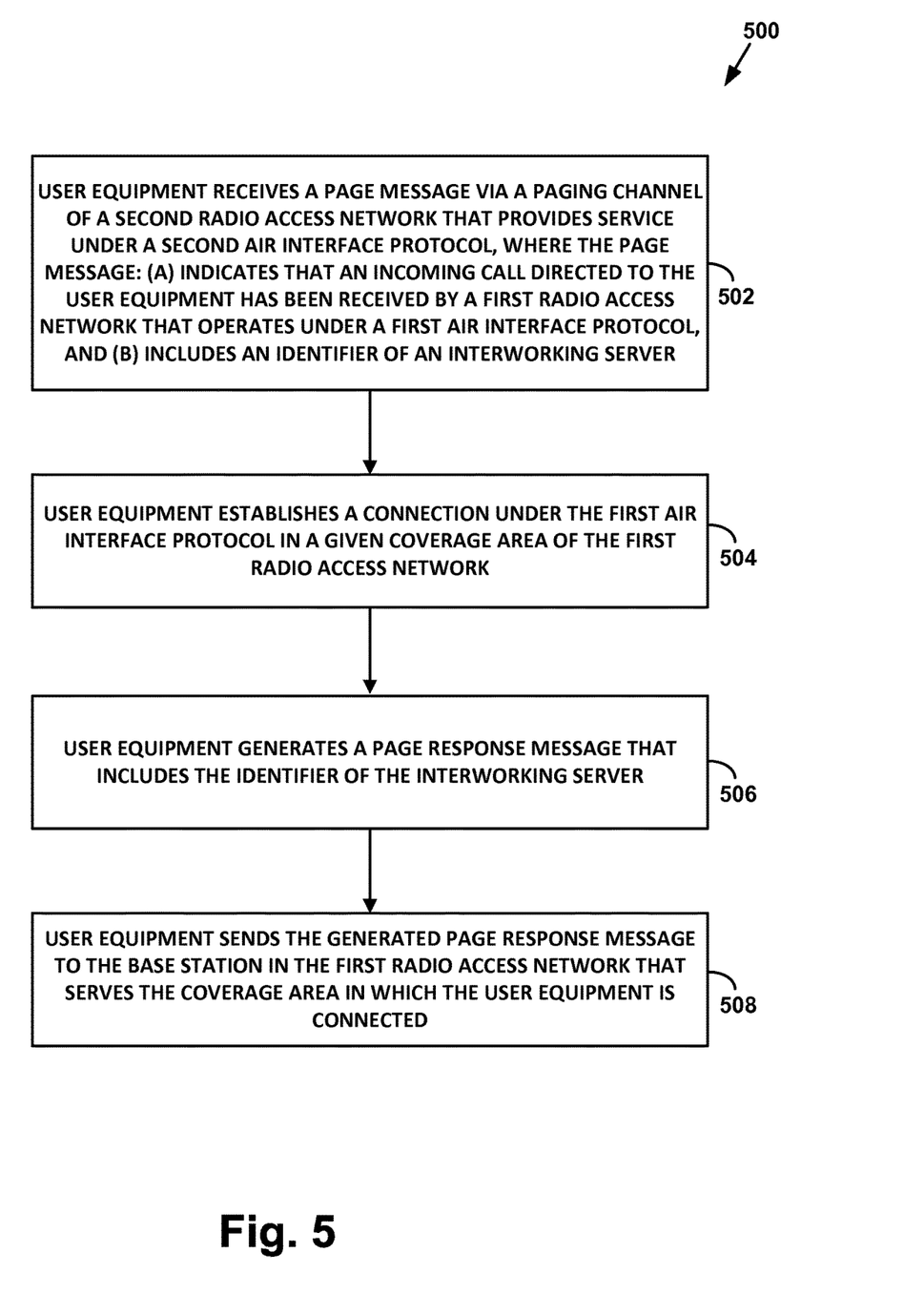
FIG. 5 is flow chart illustrating yet another method, according to an exemplary embodiment.

FIG. 5 is flow chart illustrating another method 500, according to an example embodiment. In an exemplary embodiment, method 500 may be implemented by a UE that is configured for CSFB. In particular, method 500 may be implemented by a UE that is configured for LTE communications, and configured for CSFB to fall back to a CDMA network for CDMA voice calls. Of course, it should be understood that method 500, or portions thereof, may be implemented by other entities or combinations of entities, and/or may be implemented in different scenarios with different air interface protocols, without departing from the scope of the invention.

As shown, method 500 involves a UE receiving a page message via a paging channel of a second RAN that provides service under a second air interface protocol (e.g., LTE), as shown by block 502. As further indicated by block 502, the page message: (a) indicates that an incoming call directed to the UE has been received by a first RAN that operates under a first air interface protocol (e.g., CDMA), and (b) includes an identifier (e.g., an IWS-ID) of an interworking server that facilitates communications between a first serving system of the first RAN and the second RAN. In an exemplary embodiment, the page message may be a CSFB page message sent via an LTE paging channel, which indicates that the UE should fall back to CDMA to answer a CDMA voice call. However, other types of page messages are also possible.

In response to receiving the page message, the UE establishes a connection under the first air interface protocol in a given coverage area of the first RAN, as shown by block 504. For instance, the UE may perform a scan for available CDMA pilot signals, detect at least a pilot signal for the given coverage area during the scan, determine that the pilot signal for the given coverage area is stronger than any other detected pilot signal, and responsively establish a connection with the base station that serves the given coverage area.

In further response to receiving the page message, the UE generates a page response message that includes the identifier of the interworking server, as shown by block 506. The UE then sends the generated page response message to the base station in the first RAN, which serves the coverage area in which it is connected, as shown by block 508.

By including the identifier of the interworking server (e.g., the IWS-ID) in the page response message, implementation of method 500 by a UE may facilitate exemplary network-side methods, such as methods 400 and 450. This, in turn, may improve service is at an inter-system border in a CDMA network (although this potential benefit should not be interpreted as a requirement). More specifically, consider the scenario where the UE last registered in a first sector of a CDMA network, which is served by a first MSC, and subsequently, at block 504, has connected in another sector of the CDMA network that is served by a second MSC (which is different than the first MSC). In this scenario, by including the IWS-ID in its page response message at block 508, the UE may facilitate an inter-system handoff from the first MSC to the second MSC, in accordance with methods 400 and 450.

In a further aspect, note that blocks 504 to 508 of method 500 may be performed in response to the page message that includes the identifier of the interworking server. In some embodiments, these responsive actions may only be performed by the UE when a page message includes an IWS-ID. More specifically, when the UE receives a page message at block 502, the UE may responsively determine whether the page message includes an IWS-ID. If the page message does, in fact, include an IWS-ID, this may indicate that the UE was paged using a CSFB paging process, and that an example method may help to prevent a dropped call or delayed call connection by, e.g., facilitating an inter-system handoff, if appropriate. Accordingly, if the UE detects an IWS-ID in the page message received at block 502, then the second serving system may proceed with the remainder of method 500. On the other hand, if the UE does not detect an IWS-ID in the page message received at block 502, then the UE may proceed to send a page response message that does not include an IWS-ID, and/or take some other action.

It should be understood that the conditioning of an exemplary UE-implemented method (or portions thereof) upon the inclusion of an IWS-ID in the page message, and/or the termination of an exemplary method when the page message does not include an IWS-ID, is optional. Further, in some embodiments, it may be considered undesirable to perform an exemplary method, such as method 500, when a page message is not a CSFB page message (however, in other embodiments, it may not be considered undesirable to perform an exemplary method in this scenario).

V. Conclusion

It should be understood the arrangements and functions described herein are presented for purposes of example only, and that numerous variations are possible. For instance, elements can be added, omitted, combined, distributed, reordered, or otherwise modified. Further, where this document mentions functions that can be carried out by a device or other entity, it should be understood that the functions may be implemented by software (e.g., machine language instructions stored in data storage and executable by a processor), firmware, and/or hardware.

We claim:

1. A method comprising:
receiving, by a first serving system in a first radio access network (RAN) that provides service under a first air interface protocol, an incoming call directed to a user equipment (UE);
sending, by the first serving system, to an interworking server that facilitates communications between the first RAN and a second RAN that provides service under a second air interface protocol, a page message that indicates the incoming call under the first air interface protocol, such that the interworking server provides the page message for transmission to the UE, by a base station in the second RAN, via a paging channel of the second RAN, wherein the second air interface protocol is different from the first air interface protocol;
receiving, by a second serving system in the first RAN, a page response message that is transmitted by the UE in response to the page message, wherein the page response message comprises an identifier of the interworking server inserted into the page response message by the UE, and wherein the second serving system is different from the first serving system;
based at least in part on the identifier of the interworking server, the second serving system determining that the incoming call was received by the first serving system; and
responsively initiating an inter-system handoff to handoff the incoming call from the first serving system to the second serving system.

2. The method of claim 1, wherein the interworking server facilitates circuit-switched fallback (CSFB) between the first RAN and the second RAN.

3. The method of claim 1, wherein the first air interface protocol comprises a CDMA protocol, and wherein the second air interface protocol comprises a Long-Term Evolution (LTE) protocol.

4. The method of claim 1, wherein the first RAN provides service under comprises a CDMA protocol, wherein the first serving system comprises a first mobile switching center (MSC) in the first RAN, and wherein the second serving system comprises a second MSC in the first RAN.

5. The method of claim 1, wherein the receiving the incoming call comprises receiving a voice call under a CDMA protocol.

6. The method of claim 1, wherein sending the page message to the interworking server causes the interworking server to provide the page message for transmission to the UE via a paging channel of the second RAN.

7. The method of claim 1, further comprising:
receiving the page message at the interworking server;
encapsulating, by the interworking server, the page message; and
sending the encapsulated page message from the interworking server to the second RAN for transmission to the UE.

8. The method of claim 1, wherein the UE is initially registered with a first base station that is served by the first serving system in the first RAN, the method further comprising:
receiving the page response message at a second base station that is served by the second serving system in the first RAN; and sending the page response from the second base station to the second serving system.

9. A method comprising:
receiving, by a second serving system in a first radio access network (RAN) that provides service under a first air interface protocol, a page response message that is transmitted by a user equipment (UE) in response to a page message for an incoming call under the first air interface protocol;
based at least in part on an identifier of an interworking server that is included in the page response message, the second serving system determining whether or not an indication of the incoming call was previously received at the second serving system, wherein the interworking server facilitates communications between the first RAN and a second RAN that provides service under a second air interface protocol, wherein the second air interface protocol is different from the first air interface protocol;
if the indication of the incoming call was not previously received at the second serving system, then the second serving system: (a) using the identifier of the internetworking server as a basis for identifying a first serving system in the first radio access network that received the indication of the incoming call, wherein the second serving system is different from the first serving system, and (b) initiating an inter-system handoff to handoff the incoming call from the first serving system to the second serving system; and
otherwise, if the indication of the incoming call was previously received at the second serving system, then the second serving system connecting the incoming call to the UE.

10. The method of claim 9, further comprising the second serving system initially determining that the received page response message includes the interworking identifier.

11. The method of claim 9, further comprising the second serving system conditioning the performance of the method upon an initial determination that the page response message includes the interworking identifier.

12. The method of claim 9, wherein the interworking server facilitates circuit-switched fallback (CSFB) between the first RAN and the second RAN, wherein the first air interface protocol comprises a CDMA protocol, and wherein the second air interface protocol comprises a Long-Term Evolution (LTE) protocol.

13. The method of claim 9, wherein the first RAN provides service under comprises a CDMA protocol, wherein the first serving system comprises a first mobile switching center (MSC) in the first RAN, and wherein the second serving system comprises a second MSC in the first RAN.

14. The method of claim 9, wherein the receiving the incoming call comprises receiving a voice call under a CDMA protocol.

15. The method of claim 9, wherein the UE is initially registered in a first coverage area that is served by the first serving system in the first RAN, the method further comprising:

receiving the page response message in a second coverage area that is served by the second serving system in the first RAN; and
sending the page response from a base station that serves the second coverage to the second serving system.

16. A method comprising:
receiving, by a user equipment (UE), a page message, wherein the UE receives the page message via a paging channel of a second radio access network (RAN) that provides service under a second air interface protocol, wherein the page message indicates an incoming call directed to the UE has been received by a first RAN that operates under a first air interface protocol, wherein the page message comprises an identifier of an interworking server that facilitates communications between a first serving system of the first RAN and the second RAN and wherein the second air interface protocol is different from the first air interface protocol; and
in response to receiving the page message that includes the identifier of the interworking server, the UE:
establishing a connection under the first air interface protocol in a given coverage area of the first RAN, wherein the given coverage area is served by a given serving system;
generating a page response message that includes the identifier of the interworking server so as to facilitate a determination by the given serving system as to whether or not the given serving system or a different serving system initiated transmission of the page message; and
sending the generated page response message to a base station that serves the given coverage area.

17. The method of claim 16 wherein the interworking server facilitates circuit-switched fallback (CSFB) between the first RAN and the second RAN.

18. The method of claim 16, wherein the first air interface protocol comprises a CDMA protocol, and wherein the second air interface protocol comprises a Long-Term Evolution (LTE) protocol.

19. The method of claim 16, wherein, at a time that the incoming call was received at the given serving system, the UE was registered with the base station served by the given serving system, and wherein the base station with which the connection is established is a different base station served by the different serving system of the first RAN.

20. The method of claim 19, further comprising, before establishing the connection under the first air interface protocol with the different base station in the first RAN, the UE:
performing a scan for available pilot signals for coverage areas defined under the first air interface protocol, wherein a pilot signal for the given coverage area of the different base station is detected during the scan; and
determining that the pilot signal for the given coverage area of the different base station is stronger than any other detected pilot signal and responsively establishing the connection with the different base station.

* * * * *

UNITED STATES PATENT AND TRADEMARK OFFICE
CERTIFICATE OF CORRECTION

PATENT NO. : 9,642,043 B1
APPLICATION NO. : 14/572435
DATED : May 2, 2017
INVENTOR(S) : Ryan Dreiling, Paul Andreas and John Prock Page 1 of 1

It is certified that error appears in the above-identified patent and that said Letters Patent is hereby corrected as shown below:

On the Title Page

At item (72) Inventors:

Please delete "Ryan Drailing, Lenexa, KS (US)" and replace it with --Ryan Dreiling, Lenexa, KS (US)--.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*